United States Patent [19]

Hider et al.

[11] 3,868,320
[45] Feb. 25, 1975

[54] TREATMENT OF PAPER BOX PLANT EFFLUENTS

[75] Inventors: Shibley A. Hider, Toledo, Ohio; John K. Rogers, Valdosta, Ga.; Colbert W. Wilkins, Toledo, Ohio

[73] Assignee: Owens-Illinois Inc., Toledo, Ohio

[22] Filed: July 30, 1973

[21] Appl. No.: 383,574

[52] U.S. Cl............... 210/53, 162/189, 210/45
[51] Int. Cl.............................................. B01d 21/01
[58] Field of Search............ 162/4, 5, 189; 210/42, 210/45, 46, 47, 51–54; 260/233 R

[56] References Cited
UNITED STATES PATENTS

| | | | |
|---|---|---|---|
| 2,264,448 | 12/1941 | Möller | 210/52 |
| 3,142,638 | 7/1964 | Blaisdell | 210/52 |
| 3,262,877 | 7/1966 | Compte | 210/53 |
| 3,354,028 | 11/1967 | Illingworth | 210/53 |
| 3,575,868 | 4/1971 | Galvin et al. | 210/42 |
| 3,677,940 | 7/1972 | Fujimoto et al. | 210/52 |

Primary Examiner—Samih N. Zaharna
Assistant Examiner—Peter A. Hruskoci
Attorney, Agent, or Firm—Henry P. Stevens; Edward J. Holler

[57] ABSTRACT

Effluvial streams from paper box plants consisting primarily of flexographic ink wastes and starch wastes, which are presently treated separately, can be combined and treated as a single system. Thus, the starch effluent after mixing with the ink effluent can be flocculated more readily by treatment with multivalent metal compounds such as the alkaline earth oxides or salts such as alum or ferrous sulfate. The clarified, ink-starch effluent can then be recirculated if desired with a concomitant savings in chemical costs.

7 Claims, No Drawings

TREATMENT OF PAPER BOX PLANT EFFLUENTS

BACKGROUND OF THE INVENTION

Pollution of streams, rivers, lakes and other large bodies of natural waters is a major world problem. In the manufacture of paper boxes, for example, the two main effluents are highly colored wastes from the flexographic printing operation and starch adhesive wastes which result in increased levels of biological and chemical oxygen demand, turbidity in neighboring waterways, resistance of many local governments to accept such untreated effluents and clogging of on-site drainage fields with obnoxious, malodorous decomposition.

In some paper box plants, the flexographic ink wastes are treated separately with inorganic chemicals such as fererous sulfate and lime or sodium hypochlorite and alum to flocculate andsettle the colored material thus producing a clear supernatant. The starch wastes are also usually treated separately by enzymatic hydrolysis which alleviates the pollution problem somewhat by hydrolyzing the long chain, high molecular weight polymers of which starch is composed into glucose which is more readily consumed by bacteria. Separate treatments such as these are expensive when one considers that a medium sized papr box plant will generate about 400 pounds of starch solids and 40 pounds of flexographic ink solids per day. Thus, an efficient method of treating paper box plant effluents in a single operation would be highly desirable from both an economical and ecological viewpoint.

SUMMARY OF THE INVENTION

This invention is predicated upon the discovery that starch effluent can be flocculated more easily after the starch has been mixed with flexographic ink effluents. The starch mixtures as prepared for use in paper box plants, are alkaline and negatively charged which makes flocculation of the starch difficult. However, flexographic ink compositions contain positively charged ions. Thus, when mixed the negative potential of the starch particles is decreased. Consequently, when the two effluents are combined they can be flocculated with a multivalent metal compound such as slaked lime after which the flocculated solids are removed by settling, filtering or centrifuging.

DESCRIPTION OF THE PREFERRED EMBODIMENTS

Water based flexographic ink as used in this specification consists of from 40 to 50 percent by weight of a vehicle such as maleic or acrylic polymers, shellac, nitrocellulose or rosin esters and about 15 to 40 percent by weight of a pigment depending upon the color desired i.e., litho red is beta naphthol coupled with 2-naphthylamine-1-sulfonic acid whereas alkali blue is the reaction product of aniline and phenylate rosaniline while molybdate orange is a mixture of sodium chromate, sodium sulfate, sodium molybdate and lead nitrate. The vehicle and pigment are usually dispersed in from 20 to 35 percent by weight of water or methanol. Such inks are used to print on flexible packaging materials from flexible rubber plates which accounts for the derivation of the word 'flexographic'. The flexographic process is peculiarly adapted to the printing of cellophane, foil, paper, pliofilm, polystyrene and similar materials in web form.

A typical red flexographic ink composition contains the following ingredients:

| INGREDIENT | PARTS BY WEIGHT |
| --- | --- |
| Calcium lithol red | 9 |
| Titanium dioxide | 9 |
| Acrylic polymer (J-67)* | 25 |
| Water | 66 |
| Defoamer (Sag 447)** | 1 |

*Marketed by S. C. Johnson and Son, Inc., Racine, Wisconsin.
**Marketed by Union Carbide Corp., New York City, New York.

It is well known that starch effluents are difficult to clarify and no flocculation occurs when slaked lime (calcium hydroxide) alone is used. However, when a flexographic ink effluent which contains both a pigment and a vehicle such as maleic or acrylic polymer is mixed with a starch effluent, the ink-starch combination is easily flocculated with slaked lime or other flocculating agents such as calcium oxide, calcium chloride, magnesium oxide, alum, ferrous sulfate or magnesium hydroxide. The beneficial effect of the ink effluent is not completely understood but starch-rich effluents can be clarified when treated in combination with flexographic ink waste streams.

The amount of ink-starch solids present in the effluent is generally within the range of from 0.1 to 10 percent by weight to which from 0.1 to 1 part by weight of flocculating agent for one part of ink-starch solids is added to produce flocculation. The results of several experimental runs which demonstrate the beneficial effect of flexographic ink in treating starch effluents are shown in the examples which follow.

EXAMPLE 1

One hundred milliliters of an aqueous composition containing 5.7 grams of pearl starch solids was thoroughly mixed with an equal volume of flexographic ink containing 0.6 gram of solids primarily acrylic polymer and litho red pigment. To this mixture was added 6.3 grams of slaked lime. After stirring for 10 minutes, the ink-starch lime mixture was filtered by gravity through a 541 Whatman filter paper and the filtration rate compared with an aqueous starch-lime mixture containing 5.7 grams of solid pearl starch only in 200 ml. of water to which an equal weight of slaked lime had been added. After 3 minutes of filtration, 132 ml. of filtrate was obtained from the ink-starch-lime mixture while in the same period of time only 16 ml. of filtrate was obtained from the starch-lime mixture. It is apparent that the ink-starch mixture which was flocculated by the slaked lime, filtered much more rapidly than the starch composition only treated with slaked lime. In addition, the starch filtrate was very murky whereas the ink-starch filtrate was clear.

EXAMPLE 2

Ten gallons of an aqueous composition containing 0.27 pound of red flexographic ink solids with a maleic polymer base and 2.2 pounds of pearl starch solids were mixed with 2.2 pounds of calcium oxide and stirred vigorously for 5 minutes. The mixture was allowed to settle and then filtered by pressure through a polypropylene bag having a sieve size of 25 microns. Both the supernatant, after settling of the flocculated solids but before filtering, as well as the filtrate were extremely clear. The filtrate had a pH of 13.2 which can be recirculated to treat more starch and thus save on the cost of sodium hydroxide which is ordinarily used for this purpose.

EXAMPLE 3

One hundred milliliters of an aqueous composition containing 5 grams of a starch blend of equal amounts of pearl starch and waterproof starch and an equal volume containing 0.6 gram of red flexographic ink solids with a maleic polymer base were mixed with 1.3 grams of calcium oxide and stirred for 5 minutes. The mixture was then filtered by gravity through 541 Whatman filter paper and the filtration factor was calculated to be 37.4 percent. This factor is a relative measure of the filtration efficiency and represents the volume of filtrate after 1 minute reported as a percentage of the original volume. The filtrate was clear and had a pH of 13.

EXAMPLE 4

One hundred milliliters of an aqueous composition containing 5 grams of equal parts of pearl starch and waterproof starch were mixed with 100 ml. of an aqueous composition containing 0.6 gram of solid acrylic polymer only rather than the ink solids used in Example 3. The composition was treated with 1.3 grams of slaked lime and stirred for 5 minutes. After filtering by gravity through 541 Whatman filter paper, the filtration factor was found to be 31.6 percent but both the supernatant upon standing and the filtrate were very hazy indicating that very little or no flocculation of the starch had occurred.

EXAMPLE 5

An aqueous composition as set forth in Example 3 (except that 0.6 gram of organ flexographic ink solids with an acrylic polymer base was substituted for the red ink) was treated with lime as previously described. The filtration factor was 27.5 percent whereas both the supernatant and filtrate were very clear indicating good flocculation of the starch by the lime. The filtrate had a pH of 12.6.

EXAMPLE 6

Two hundred milliliters of an aqueous composition containing 5 grams of the starch blend of Example 4 and 0.6 gram of red acrylic based flexographic ink solids was treated first with 0.6 gram of slaked lime and then 0.8 gram of hydrochloric acid. The mixture was stirred for 10 minutes and allowed to settle before filtering through a 541 Whatman filter paper. The supernatant was opaque but the filtrate was clear and had a pH of 5.7. The filtration factor as defined in Example 3 was 21.3 percent.

EXAMPLE 7

One hundred milliliters of an aqueous composition containing 5.7 grams of pearl starch was mixed with 77 milliliters of water containing 0.46 grams of red flexographic ink solids and flocculated with 1 gram of alum ($Al_2(SO_4)_3 \cdot 18H_2O$). After settling, the mixture was filtered through 541 Whatman filter paper to obtain a clear filtrate indicating excellent flocculation of the starch-ink solids had occurred.

In other experiments, it was found that starch-rich effluents when combined with various colored flexographic inks such as those set forth in the foregoing examples could be effectively flocculated with agents other than slaked lime such as calcium chloride, magnesium oxide, ferrous sulfate and magnesium hydroxide.

What is claimed is:

1. A method of clarifying an aqueous, starch adhesive effluent from a paper box plant which comprises combining therewith an aqueous flexographic ink effluent containing about 40–50 percent by weight maleic or acrylic vehicle, and 15–40 percent by weight pigment to form a mixture containing about 8–12 parts starch solids to 1 part ink solids, flocculating the resulting mixture with a multivalent metal compound selected from the group consisting of calcium oxide, calcium hydroxide, calcium chloride, magnesium oxide, magnesium hydroxide, aluminum sulfate or ferrous sulfate, said compound added in a weight ratio of 0.1–1 parts compound to 1 part ink-starch solids and separating the flocculated solids thus formed.

2. A method as in claim 1 in which the metal compound is calcium hydroxide.

3. A method as in claim 1 in which the metal compound is calcium oxide.

4. A method as in claim 1 in which the metal compound is aluminum sulfate.

5. A method as in claim 1 in which the metal compound is ferrous sulfate.

6. A method as in claim 1 in which the flexographic ink has an acrylic polymer vehicle.

7. A method as in claim 1 in which the flexographic ink has a maleic polymer vehicle.

* * * * *